United States Patent
Tian et al.

(10) Patent No.: US 10,154,281 B2
(45) Date of Patent: Dec. 11, 2018

(54) METHOD AND APPARATUS FOR KEYPOINT TRAJECTORY CODING ON COMPACT DESCRIPTOR FOR VIDEO ANALYSIS

(71) Applicant: Mitsubishi Electric Research Laboratories, Inc., Cambridge, MA (US)

(72) Inventors: Dong Tian, Boxborough, MA (US); Huifang Sun, Woburn, MA (US); Anthony Vetro, Arlington, MA (US)

(73) Assignee: Mitsubishi Electric Research Laboratories, Inc., Cambridge ( * ) Notice: Subject to any disclaimer, the term of this patent is extended or adjusted under 35 U.S.C. 154(b) by 194 days.

(21) Appl. No.: 15/004,434

(22) Filed: Jan. 22, 2016

(65) Prior Publication Data

US 2017/0214936 A1 Jul. 27, 2017

(51) Int. Cl.
- H04N 19/54 (2014.01)
- H04N 19/527 (2014.01)
- H04N 19/593 (2014.01)
- G06K 9/00 (2006.01)
- H04N 19/46 (2014.01)
- H04N 19/52 (2014.01)
- H04N 19/23 (2014.01)
- H04N 19/543 (2014.01)
- H04N 19/58 (2014.01)

(52) U.S. Cl.
CPC ......... *H04N 19/54* (2014.11); *G06K 9/00751* (2013.01); *H04N 19/46* (2014.11); *H04N 19/527* (2014.11); *H04N 19/593* (2014.11); *H04N 19/23* (2014.11); *H04N 19/52* (2014.11); *H04N 19/543* (2014.11); *H04N 19/58* (2014.11)

(58) Field of Classification Search
CPC ..... H04N 19/527; H04N 19/54; H04N 19/593
See application file for complete search history.

(56) References Cited

U.S. PATENT DOCUMENTS

| | | | |
|---|---|---|---|
| 2013/0155058 A1* | 6/2013 | Golparvar-Fard | G06T 19/006 345/419 |
| 2016/0050372 A1* | 2/2016 | Lindner | H04N 5/23267 348/46 |
| 2016/0063330 A1* | 3/2016 | Xu | G06T 7/73 382/103 |

OTHER PUBLICATIONS

Huang et al. "An efficient coding framework for compact descriptors extracted from video sequence," 2015 IEEE International Conference on Image Processing. Sep. 27, 2015, p. 3822-3826.
Anonymous, "MPEG-7 overview (version 8) Coding of moving pictures and audop MPEG-7 ISO/IEC JTC1/SC29/WG11," International Organization for Standardization. Jul. 31, 2002.

(Continued)

*Primary Examiner* — Behrooz M Senfi
(74) *Attorney, Agent, or Firm* — Gene Vinokur; James McAleenan; Hironori Tsukamoto

(57) ABSTRACT

A method processes keypoint trajectories in a video, wherein the keypoint trajectories describe motion of a plurality of keypoints across pictures of the video over time, by first acquiring the video of a scene using a camera. Keypoints and associated feature descriptors are detected in each picture. The keypoints and associated features descriptors are matched between neighboring pictures to generate keypoint trajectories. Then, the keypoint trajectories are coded predictively into a bitstream, which is outputted.

20 Claims, 16 Drawing Sheets

(56) References Cited

OTHER PUBLICATIONS

Jeannin et al. "MPEG-7 Visual Motion Descriptors," IEEE Transactions on Circuits and Systems for Video Technology, IEEE Service Center, Piscataway, NJ, US. vol. 11, No. 6, Jun. 30, 2001.
ISO/IEC JTC 1/SC29. Information technology—multimedia content description interface—part 13: Compact descriptors for visual search. MPEG, N14956, 2014.
Z. Huang, L. Duan, J. Lin, S. Wang, S. Ma, and T. Huang. An efficient coding framework for compact descriptors extracted from video sequence. In Image Processing (ICIP), 2015 IEEE International Conference on, pp. 3822-3826, Sep. 2015.
Mina Makar, Vijay Chandrasekhar, Shauhyuarn Sean Tsai, David Chen, and Bernd Girod. Interframe coding of feature descriptors for mobile augmented reality. Image Processing, IEEE Transactions on, 23(8):3352-3367, 2014.
H. Mansour, S. Rane, P. Boufounos, and A. Vetro. Video querying via compact descriptors of visually salient objects. In Image Processing (ICIP), 2014 IEEE International Conference on, pp. 2789-2793. IEEE, 2014.
S. Jeannin and A. Divakaran. Mpeg-7 visual motion descriptors. Circuits and Systems for Video Technology, IEEE Transactions on, 11(6):720-724, Jun. 2001.

* cited by examiner

Algorithm 1 Intra-scalable Trajectory Coding

1: Function Intra_STC
2: Input current trajectory index $c$, $1 \leq c \leq n$, $P^c$ to be coded
3: Input reconstructed locations in the anchor picture $\hat{p}^c(t_1)$
4: Input $a$ is the acceleration parameter, *optional*
5: Output coded bitstream for $P^c$
6: Output reconstructed trajectory $\hat{P}^c$
7: SE:Int Intra-Prediction-Model
8: if Intra-Prediction-Model = 1-st-order-model then
9: Compute Parameter $v = \frac{p(t_n) - p(t_1)}{t_n - t_1} - \frac{1}{2}a(t_n - t_1)$ if encoder
10: SE:Float $v$, velocity
11: Compute trajectory predictor $p'(t_j) = p(t_1) + v(t_j - t_1)$
12: else
13: Compute Parameter $v = \frac{p(t_n) - p(t_1)}{t_n - t_2} - \frac{1}{2}a(t_n - t_1)$
14: SE:Float $v$, initial velocity
15: SE:Float $a$, acceleration
16: Compute trajectory predictor $p'(t_j) = p(t_{j-1}) + v(t_j - t_{j-1}) + \frac{1}{2}a(t_j - t_{j-1})^2$
17: end if
18: Compute residual $r(t_j) = p(t_j) - p'(t_j)$, for $t_j \in [t_2, t_3, ..., t_n]$
19: SE:Float residual $r(t_j)$, for $t_j \in [t_2, t_3, ..., t_n]$, with reconstructions $\hat{r}(t_j)$
20: Let reconstructed trajectory $\hat{p}(t_j) = p'(t_j) + \hat{r}(t_j)$, for $t_j \in [t_2, t_3, ..., t_n]$

*Fig. 5*

Algorithm 2 Inter-scalable Trajectory Coding

1: Function Inter_STC
2: Input current trajectory index $c$, $1 \le c \le n$, $P^c$ to be coded
3: Input trajectory list $\{P^1, P^2, ..., P^n\}$
4: Input reconstructed keypoints in anchor pictures, e.g. $\{\hat{p}^1(t_0), \hat{p}^2(t_0), ..., \hat{p}^n(t_0)\}$
5: Input reconstructed trajectory list $L = \{\hat{P}^{r_1}, \hat{P}^{r_2}, ..., \hat{P}^{r_m}\}$ from trajectories already coded
6: Output coded bitstream for $P^c$
7: Output reconstructed trajectory $\hat{P}^c$
8: Compute distances $d_c^r = \{d_{c,1}^r, d_{c,2}^r, ..., d_{c,m}^r\}$ from trajectories in $L$ to $P^c$
9: Compute orientations $\theta^r = \{\theta_{c,1}^r, \theta_{c,2}^r, ..., \theta_{c,m}^r\}$ from $P^c$ to trajectories in $L$
10: Sort $L$ first based on distances in $d_c^r$ in ascending order, then based on orientations $\theta^r$ in ascending order. Update $L = \{\hat{P}^{r_1}, \hat{P}^{r_2}, ..., \hat{P}^{r_m}\}$ to store the sorted list
11: Set initial reference list $L$ by keeping the first $k$ trajectories in $L$
12: Insert a mean trajectory at the beginning of trajectory list $L$
13: SE:Int ref-ind-fwd, an index in $L$
14: Fetch trajectory predictor $\hat{P}^f$ using the ref-ind-fwd$^{th}$ element in list $L$
15: SE:Boolean bi-prediction
16: if bi-prediction == False then
17: Compute residual trajectory $R = P^c - \hat{P}^f$
18: SE:Bool skip
19: if skip == False then
20: SE:Float code residual trajectory $R$ into bitstream, with $\hat{R}$ being reconstructed residual
21: else
22: Let $\hat{R} = 0$
23: end if
24: else
25: Construct a secondary reference list $L2$ based on $L$, e.g. by swapping the first two elements
26: SE:Int ref-ind-bwd, an index in $L2$
27: Fetch trajectory predictor $\hat{P}^b$ using the ref-ind-bwd$^{th}$ element in list $L2$
28: Compute trajectory predictor $\hat{P}^c = \frac{1}{d_f + d_b}(d_b \hat{P}^f + d_f \hat{P}^b)$
29: Compute residual trajectory $R = P^c - \hat{P}^c$
30: SE:Bool direct
31: if direct == False then
32: SE:Float code residual trajectory $R$ into bitstream, with $\hat{R}$ being reconstructed residual
33: else
34: Let $\hat{R} = 0$
35: end if
36: end if
37: Let reconstructed trajectory $\hat{P}^c = \hat{P}^c + \hat{R}$

*Fig. 10*

Algorithm 3 Scalable Trajectory Coding

1: Function Scalable_TC
2: Input Trajectory list $\{p^0, p^1, ..., p^n\}$
3: Input Reconstructed locations $\{\hat{p}^1(t_0), \hat{p}^2(t_0), ..., \hat{p}^n(t_0)\}$ in anchor pictures
4: Output Coded bitstream, Reconstructed trajectory list $\{\hat{p}^1, \hat{p}^2, ..., \hat{p}^n\}$
5: for $c = 1; c \leq n; c++$ do
6:    SE:Boolean: IntraMode[$c$]
7:    if IntraMode[$c$] = $True$ then
8:       Call Function, Intra_STC, to code $P^c$
9:    else
10:      Call Function, Inter_STC, to code $P^c$
11:    end if
12: end for

*Fig. 11*

| Keypoint Index in Current GOP | Keypoint Index from Preceding GOP |
|---|---|
| 1 | 1 |
| 2 | 3 |
| 3 | 4 |
| 4 | 0 |
| 5 | 0 |
| 6 | 0 |

*Fig. 14*

| Algorithm 4 Feature Selection for $L_a$ |
|---|
| 1: Input Sorted feature list from key picture, $I$; $flag[i], \forall i \in I$ if in Query Mode |
| 2: Output $L_a$ filled with selected feature descriptors being columns |
| 3: Set and Code Mode |
| 4: if Mode == Database Mode then |
| 5:    Let $flag[i] = true, \forall i \in I$ |
| 6: else if Mode == Query Mode then |
| 7:    Code $flag[i], \forall i \in I$ |
| 8: end if |
| 9: Set $L_a$ with column vectors being feature descriptors for all features with $flag[i] ==$ $true$; |

*Fig. 15*

Algorithm 5 Projected Proximal-point Alternating Least Squares

1: Input $X$, factor rank $r$, $\rho$, maxiter
2: Output $\hat{L}, \hat{R}$
3: Initialize $k = 0$, $L_0 = [L_a, L_{b,0}]$, $R_0 = [R_a^T, R_{b,0}^T]^T$, where $L_{b,0} \in U_{[0,1]}$, $R_{b,0} \in U_{[0,1]}$
4: while not converged and $k <$ maxiter do
5:    Update the compact descriptor $L = [L_a, L_b]$
6:    $\tilde{L} = (\rho L_k + X R_k^T)(\rho I_r + R_k R_k^T)^{-1}$
7:    $L_{k+1,:} = \tilde{L}_{:,:}/\|\tilde{L}_{:,:}\|_2$
8:    Update the binary selector $R = \begin{bmatrix} R_a \\ R_b \end{bmatrix}$
9:    $\tilde{R} = (\rho I_r + L_{k+1}^T L_{k+1})^{-1}(\rho R_k + L_{k+1}^T X)$
10:    $R_{k+1,j} = \text{Proj}_{E_r}(\tilde{R}_j), \forall j \in \{1, \ldots, n\}$
11:    $k = k + 1$
12: end while
13: $\hat{L} = L_k, \hat{R} = R_k$

*Fig. 16*

METHOD AND APPARATUS FOR KEYPOINT TRAJECTORY CODING ON COMPACT DESCRIPTOR FOR VIDEO ANALYSIS

FIELD OF THE INVENTION

In general, this invention relates to video analysis, and more particularly to compact descriptors extracted from videos that can be used for image or video query, retrieval, matching, classification and other analysis tasks.

BACKGROUND OF THE INVENTION

The advent of inexpensive cameras and inexpensive storage has made it practical to store images and video in very large databases. For example, it is estimated that one popular social media provider stores about 80 billion images, and processes 600,000 images per second.

The commercial viability of such databases depends in large part on the availability of search and retrieval application. Thus, a great effort has been devoted to search and retrieval mechanisms for images and images. In general, such mechanisms rely on identifying points of interest in an image, often referred to as keypoints, and then extracting features from these keypoints that remain accurate when subject to variations in translation, rotation, scaling and illumination.

Examples of such features include scale-invariant feature transform (SIFT), speeded-up robust features (SURF), binary robust invariant scalable keypoints (BRISK), fast retina keypoint (FREAK), histogram of oriented gradients (HoG), circular Fourier-HOG (CHOG), and others.

To reduce the bandwidth and complexity of such applications, while preserving matching accuracy and speed, the features are often aggregated and summarized to more compact descriptors. Approaches for compacting the feature spaces include principal component analysis (PCA), linear discriminant analysis (LDA), boosting, spectral hashing, and the Bag-of-Features (BoF) approach. The BoF is used to convert features to compact descriptors (codewords) using cluster centers produced by means clustering.

The compact descriptors extracted from a query image or video can be compared to descriptors extracted from images in the database to determine similar images. The International Organization for Standardization (ISO) and the International Electrotechnical Commission (IEC) has published a standard Compact Descriptors for Visual Search (CDVS) that is designed to address the challenges for searching image datasets. MPEG CDVS provides a standardized way on descriptors for efficient still image search applications. The major steps in the pipeline include:
1. Take an image as input;
2. Detect keypoints in the image;
3. Extract and aggregate local descriptors for the keypoints;
4. Generate a global descriptor, scalable compressed fisher vector (SCFV);
5. Compress the global descriptor;
6. Code the coordinates of the selected keypoints;
7. Compress the selected local descriptors; and
8. Output the compacted descriptor bitstream.

To extend conventional image descriptors to derive video descriptors is not straightforward. One naive method extracts image descriptors from each image in the video sequence, treating each image separately. That method fails to exploit the fact that features extracted from successive video images tend to be very similar, and describe similar keypoints, resulting in a very redundant representation. Furthermore, that method does not remove features that are not persistent from image to image, and probably does not describe the video sequence very well. Thus, simply collecting individual image descriptors is bandwidth-inefficient and significantly increase matching complexity.

Another approach is to compress the descriptors derived from each video image, exploiting interframe predictions in the video sequence. Those methods exploit an affinement transformation, to predict feature descriptors and keypoint locations. However, those methods are limited in several aspects:
1) They do not address the problem of discovering a small set of descriptors that can represent a visually salient object.
2) Such approaches generally do not provide keypoint trajectories on the video signal.
3) Affine transformation used to code the keypoint locations in the subsequent pictures involves high complexity for extraction and is likely to suffer when accurate motion details are of the concern. And it is very difficult to use a single particular motion model to cover all types of motion in a practical application.

Yet another approach utilizes low-rank non-negative matrix factorization that can exploit the near stationarity of salient object descriptors in the scene. Hence, that method can determine low dimensional clusters from the visual descriptors extracted from videos. Unfortunately, that approach quickly becomes unstable as the number of clusters increases. In addition, that approach does not provide a full representation for keypoint trajectories.

FIG. 1 shows the work scope of MPEG-7 prior art. Features are extracted 110 from a video 110 and MPEG-7 descriptors is then generated 130. The descriptors can be provided to a search engine 140 to determine content in a database 150 with similar descriptors. MPEG-7 is a standard for describing features of multimedia content. It does not provide a way to extract multimedia descriptors and features, or a way to measure similarity between contents.

More specifically, MPEG-7 standardized motion descriptors can be classified into two categories, as shown in FIG. 2. One includes camera motion 230, motion activity 240, warping parameters 250 for video segments 210, and the other includes motion trajectory 260, parametric motion 270 for moving regions 220 in the video.

The motion trajectory describes the movement of one representative point of a specific region, composing of a set of positions and a set of interpolation functions describing the path. Because the motion trajectory is for a moving region, motion blobs are typically detected and each motion blob corresponds to a trajectory descriptor. In a typical application for a sport video, each player has a single representation point and one trajectory maintained.

The motion descriptors in MPEG-7 prior art work provide high-level semantic information for video analysis tasks, and such motions are limited for rigid objects, which is inefficient for some nowadays applications, e.g., human action recognition. The motion descriptors defined by MPEG-7 for a rigid object are at object levels, and it has not been an issue to represent the object-level trajectories in an efficient way at that time.

SUMMARY OF THE INVENTION

The embodiments of the invention aims to support a video analysis method and system, e.g., video retrieval, matching, human action recognition, satisfying the following requirements when comparing to a still image analysis method and system:

1. Identify a similar object/scene of interest with a similar motion from a large scale video database;
2. Code the feature descriptors extracted from a video efficiently;
3. Support to extract high-level motion descriptors from the decoded feature descriptors;
4. Low complexity/low cost at encoder; and
5. Be compatible to image based retrieval/matching system.

In addition to analyze objects and scenes based on spatial information, the video analysis system in particularly is featured by analyzing motion information over the temporal direction. For example, introducing motion in context of visual search is to enable a new dimension/functionality compared to a still image search system.

Keypoint trajectory is essentially to arrange the keypoints across temporal directions. The trajectories of each keypoint represent low-level motion information, which can form the foundation for high level motion analysis tasks.

Two novel approaches to predictively code the keypoint trajectory are to be described to store/transmit the keypoint trajectory. One is scalable trajectory coding (STC) and the other is interframe trajectory coding (ITC).

A method extracting the keypoint trajectory using a constrained matrix factorization approach is also described.

An important goal of the invention is to limit the computing power required at the encoder, e.g., a mobile computing device or low cost camera, but still allow advanced motion analysis at the decoder and server.

With prior art approaches of interframe prediction for feature descriptors, the locations of each feature are coded using an affine motion model. Extracting such motion parameters is a typical higher level semantic understanding about motion, and thus it involves complex computations.

One embodiment, scalable trajectory coding (STC), addresses applications that do not require low-delay in response, but scalability in terms of trajectory is desired. In this approach, the locations in trajectories are coded in an order of from one trajectory to the next trajectory. Because the trajectories of neighboring keypoints are likely to be similar to each other, such redundancies are used for a predictive coding. This method provides a fine granular scalable bitstream regarding to trajectories.

With the second embodiment, interframe trajectory coding (ITC), we code the locations in the keypoint trajectory from picture to picture by removing the redundancy between neighboring pictures.

If we consider to limit the cost to implement a video analysis system on top of existing image analysis systems, the video analysis system is expected to be backward compatible with the image analysis system. That is, an image analysis system should be able to extract useful feature descriptors from a subset of images in the video and can at least perform analysis in the spatial domain.

In this invention, without sacrificing generality, we take Compact Descriptor for Visual Search (CDVS) as an example system for image analysis applications; and take an emerging Compact Descriptor for Video Analysis (CDVA) as example system for video analysis applications. The CDVA solution is proposed to be compatible to CDVS on a subset of pictures in a video signal.

To achieve the backward compatibility, the feature descriptors associated with some pictures in the video are coded in the way as defined by CDVS, and such pictures are hereinafter referenced as key pictures, anchor pictures, or Intra pictures. In other words, the coding of feature descriptors from key pictures does not rely on any other pictures, while the coding of non-key pictures can depend on key pictures and/or other non-key pictures so as to exploit the redundancy.

BRIEF DESCRIPTION OF THE DRAWINGS

FIG. 5 is a block diagram of pseudocode for an Intra-scalable Trajectory Coding algorithm according to embodiments of the invention;

FIG. 10 is a block diagram of pseudocode for an example implementation of Inter-scalable Trajectory Coding including Bi-scalable Trajectory Coding according to embodiments of the invention;

FIG. 11 is a block diagram of pseudo code of an example implementation of Scalable Trajectory Coding according to embodiments of the invention;

FIG. 14 is an example mapping table on how to join trajectories between neighboring GOPs according to embodiments of the invention:

FIG. 15 is a block diagram of pseudo code for selecting a first part in matrix L for a constrained matrix factorization approach according to embodiments of the invention; and FIG. 16 is a block diagram of pseudocode for an embodiment on how to solve a constrained matrix factorization problem according to embodiments of the invention.

DETAILED DESCRIPTION OF THE PREFERRED EMBODIMENTS

Figure 1:
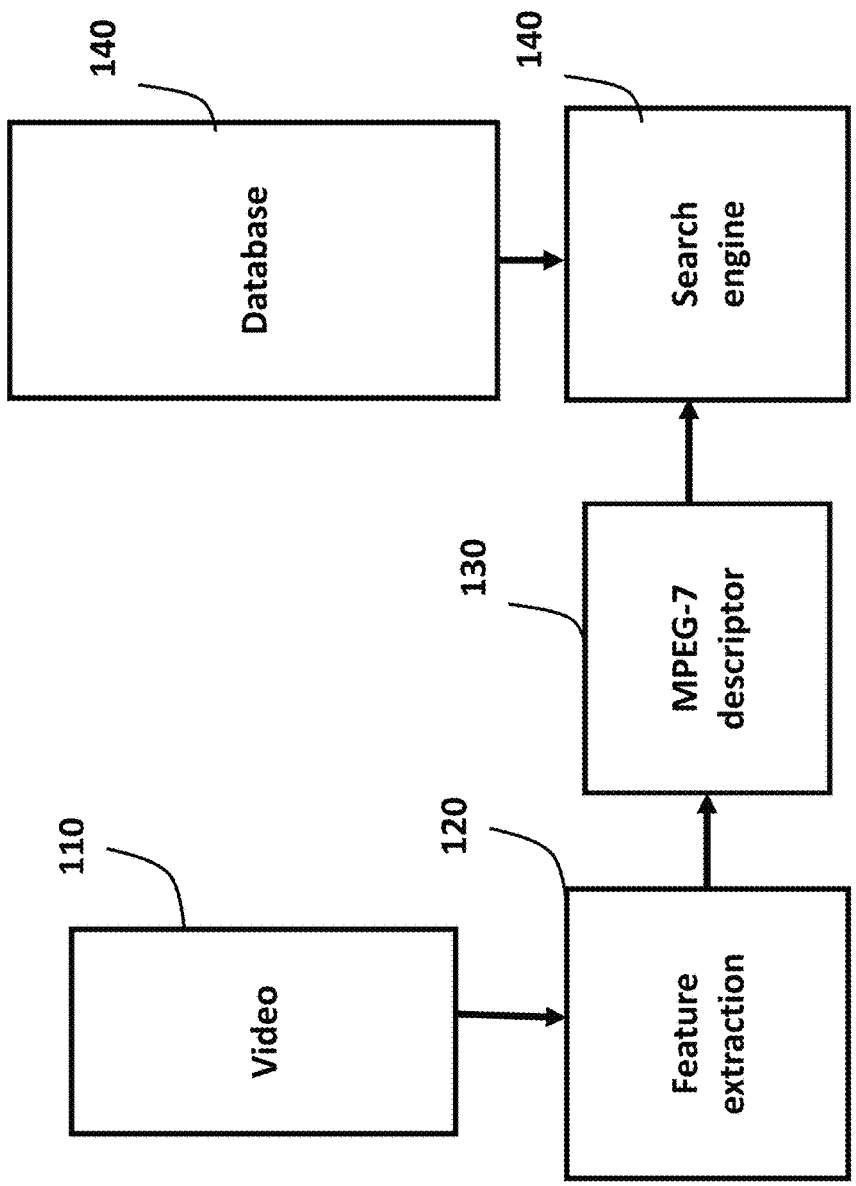
FIG. 1 is a schematic of conventional MPEG-7 implemented searching.
Figure 2:
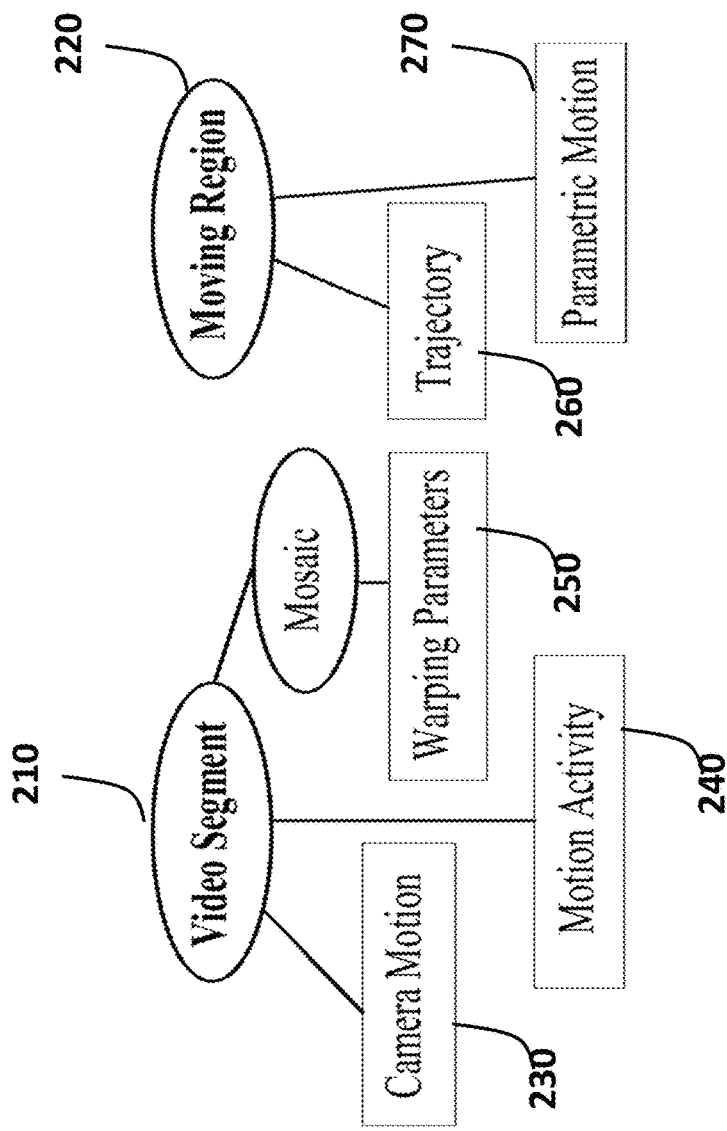
FIG. 2 is a block diagram of conventional MPEG-7 standardized motion descriptors.
Figure 3:
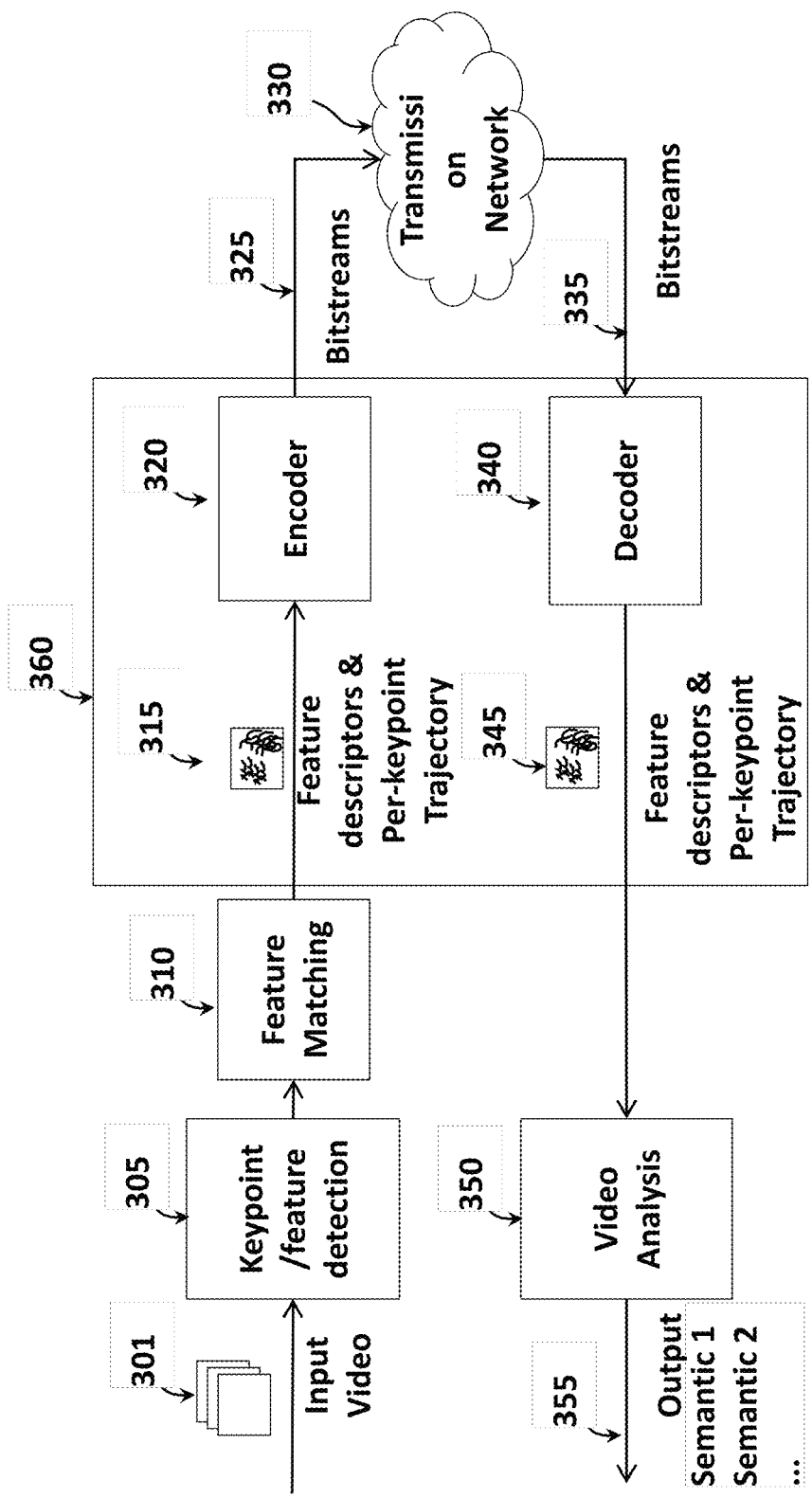
FIG. 3 is a block diagram of a video analysis method and system according to embodiments of the invention.

FIG. 3 shows a method and system for video analysis according to embodiments of the invention. The video input 301 to the system is conveyed to a "keypoint/feature detection" module 305, then the keypoint/feature are matched via block 310. This leads to keypoint trajectories information 315. In one embodiment of the invention, we use a constrained matrix factorization for feature matching as an option to implement block 310. It is understood that other know methods can also be used to extract the keypoint trajectories.

The detected feature descriptors and keypoint trajectories are then encoded 320 and the bitstream 325 are stored or transmitted over network 330. The received bitstream 335 can later be decoded 340. Finally, the reconstructed feature descriptors and keypoint trajectories 345 are fed to a video analysis module 350 at the decoder and output the analysis results 355, e.g., semantics understanding about the video. The steps of the method can be performed in a processor connected to memory and networks by buses as known in the art.

This invention mainly addresses the coding for keypoint trajectories. We extract trajectory information for each keypoint and have them coded and transmitted to a video data analysis server. From the decoded keypoint trajectories at the server, high-level motion descriptors, e.g., as in MPEG-7, can be generated based on the keypoint trajectories and are later used for video understanding tasks, e.g., motion segmentation, motion modelling, global motion estimation, action recognition, video searching/analysis based on motion, etc., which composes block 350 in FIG. 3.

The following sections are organized into four parts. Section 1 describes the concept of keypoint trajectory, which is generated using a feature matching algorithm. Then, the scalable trajectory coding (STC) are described in Section 2. In Section 3, we describe the interframe trajectory coding (ITC) approach. The constrained matrix factorization is given Section 4 as a novel way to extract the keypoint trajectories.

1 Keypoint Trajectory

When dealing with a video signal, it is often desired to split the video sequence into group of pictures (GOPs) so as to limit the processing complexity and delays. In this invention, we assume that the GOP structures are split for every n pictures. Further, like in conventional video compression systems, one GOP can be ensured not to cover pictures from different scenes so as to favor the coding efficiency. This is still a useful guideline in compressing feature descriptors and their locations and hence it is enforced in this invention.

Within one GOP, the feature descriptors from certain pictures, e.g., the first picture, are coded independently from others using a conventional way, like CDVS in one example scenario. This type of picture is referred as a key picture, an anchor picture or an Intra picture.

Along the temporal direction, the trajectory of each keypoint reveals detailed motion information of a keypoint. By transmitting the keypoint trajectory, it enables capabilities at a receiver and server to extract high level motion semantics, e.g., the high level motion descriptors as defined in the MPEG-7 standard. Hence it is possible to conduct high level video analysis tasks, e.g., locate objects or scenes with similar motions or perform action recognition. The keypoint trajectory can also be used to localize, in spatial and temporal domains, a target keypoint. The temporal localization can be achieved at picture precision instead of the GOP precision.

In this invention, a trajectory for a keypoint is represented by a sorted set of positions over a temporal (t) direction, $$P(t_j)=(P_x(t_j),P_y(t_j)),\ t_j\in\{t_1,t_2,\ldots,t_n\}. \quad (1)$$

The n pictures in a GOP are associated with time stamps $\{t_1, t_2, \ldots, t_n\}$. We use $P_i$, $i\in\{x,y\}$ to denote $P_x$ or $P_y$.

We assume that there are m keypoints that have trajectories. Let $P^c$, $c\in[1,m]$ denote the position in the c-th trajectory. In MPEG-7, there is only one representative point for one object, that is m=1 for a single object in the picture. However, in this invention, we typically consider the case with m>>1.

Figure 4:
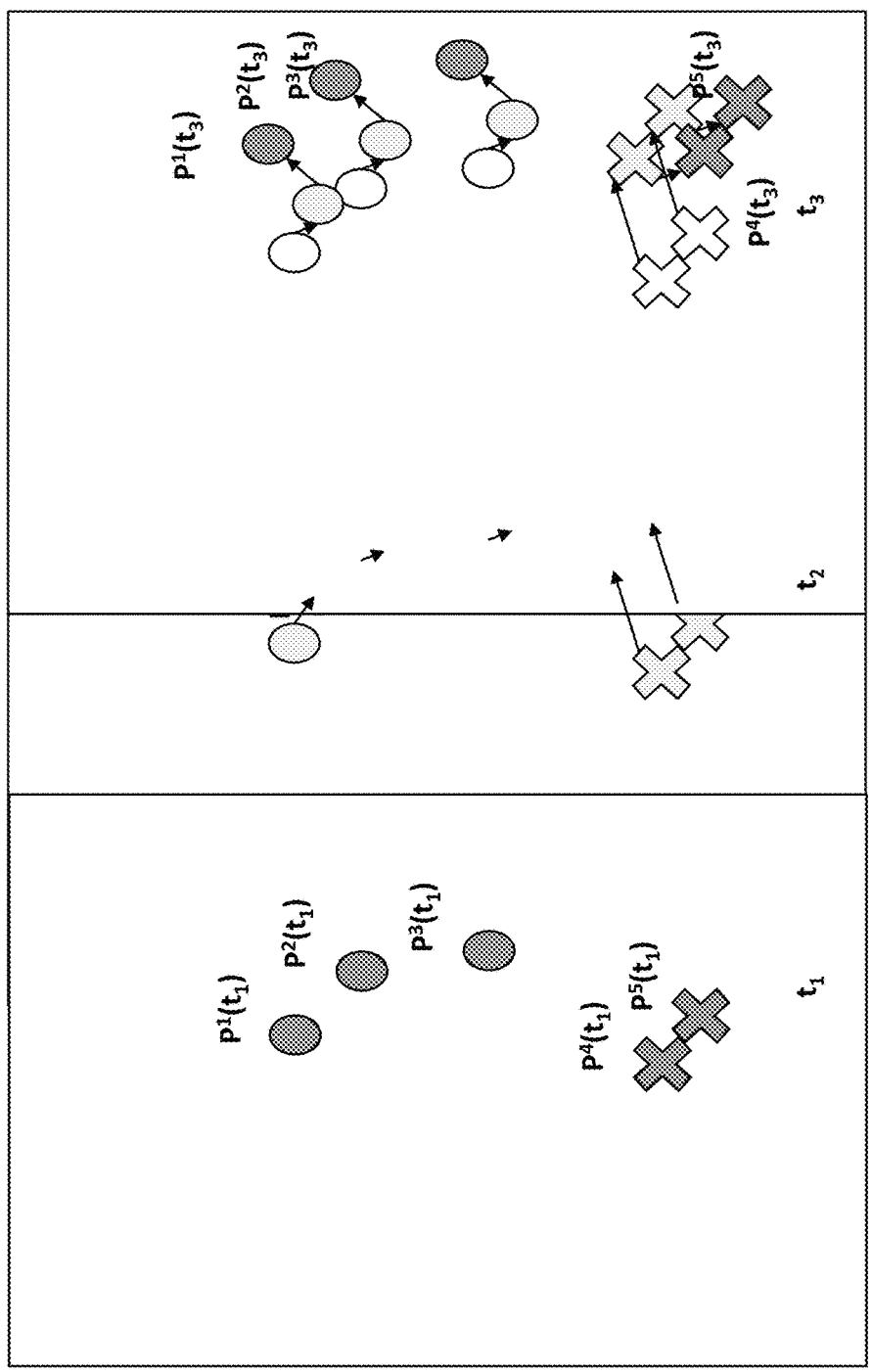
FIG. 4 is a schematic of five (5) keypoints and corresponding keypoint trajectories according to embodiments of the invention.

FIG. 4 shows five example trajectories corresponding to five keypoints. The example GOP has three pictures. Our task is to code the trajectories $\{P^c(t_j), \forall c\in[1,5], \forall j\in[1,3]\}$. In particularly, $\{P^c(t_1), \forall c\in[1,5]\}$ in the key picture are coded using CDVS. We describe how to code $P^c(t_j)$, $c\in[1,5]$, $j\in[2,3]$ for this invention.

It is worthy to emphasize that one trajectory $P^c(t_1)$ represents the travel path of the c-th keypoint over time. Hence, feature matching is required to sort the keypoints from neighboring pictures, such that the same keypoint from different pictures share the same keypoint index c. In addition, beside to conventional feature matching methods, in this invention, we also describe a novel approach to form the trajectories via a constrained matrix factorization method in Section 5.

If we simply extract the feature descriptors of neighbor pictures from a CDVS bitstream, we do not obtain the trajectory information because there is no connectivity for keypoints over temporal direction. Of course, an additional process at the receiver can be used to generate the trajectory information. In this invention, we intend to detect the keypoint trajectory at the encoder, because it is helpful in removing erroneous feature descriptors and can provide superiority with coding the keypoint locations.

There are a couple options to represent the positions in a trajectory P. For the key picture, we use the coordinates relative to the image coordinate system for $\{P(t_j), j=1\}$. For non-key pictures, $\{P(t_j), \forall j\in[2,n]\}$ can be positions represented relative to the image coordinate system $\{P_{(a)}(t_j)\}$, or they can be a relative position change using its previous picture as a reference $\{P_{(b)}(t_j)\}$. They are convert-able via the following equation, $$P_{(a)}(t_j)=P_{(a)}(t_{j-1})+P_{(b)}(t_j),\ \text{for}\ j\in[2,n]. \quad (2)$$

In this description, P can be either of the two representations, unless specified otherwise.

Moreover, let $\hat{P}$ denote the reconstructed trajectory from a coded bitstream. For example, we use $\hat{P}(t_1)$ to denote the reconstructed position of keypoints in the first picture, which is available as a reference to code the remaining positions in the trajectory $\{P(t_j), \forall j\in[2,n]\}$.

In one embodiment, during the process to generate the keypoint trajectories, we could determine those keypoints that are attached to any trajectories, which are likely to be less useful for the video analysis. It is proposed to discard such isolated keypoints without affecting the video analysis.

Though we focus on coding 2D trajectories, it should be noted that the principles of this invention can be easily extended to code keypoint 3D trajectories. The 2D trajectory $P=(P_x, P_y)$ is augmented by a depth direction z to have a 3D trajectory $P=(P_x, P_y, P_z)$.

2 Scalable Trajectory Coding (STC)

In this section, we describe how to compress a keypoint trajectory in a predictive way, which employs the redundancy within one trajectory or between trajectories. The approach in this section is featured with a fine granular scalability when performing a video analysis task based on the trajectories, and is thus named Scalable Trajectory Coding (STC). That is, the server can return coarse results after the first trajectory is reconstructed, and the results can be refined in a fine granular manner by appending more and more trajectories. With the other approach described in Section 3, interframe trajectory coding (ITC), however, the server has to decode all trajectories before having some trajectory-based results.

With STC, we code all keypoints in one trajectory before coding another trajectory. For the example trajectories in FIG. 4, the points in the trajectories are coded in the following order:

$$\{P^1(t_2), P^1(t_3); P^2(t_2), P^2(t_3); \ldots ; P^5(t_2), P^5(t_3)\}, \quad (3)$$

after $\{P^c(t_1), \forall c \in [1,5]\}$ have been coded using CDVS.

2.1 Intra-Scalable Trajectory Coding

Some trajectories are coded in a mode called Intra-scalable Trajectory coding (Intra-STC). Such trajectories are coded independently from other trajectories and can be recovered without dependencies on any other trajectories. In this section, a trajectory P using absolute locations $P_{(a)}$ relative to image coordinate system is selected in the description.

Intra-STC is used to code $P_i = \{p_i(t_j), \forall t_j \in [t_2, t_3, \ldots, t_n]\}$ along each dimension $i \in \{x, y\}$. Pseudocode for an encoder implementation is shown in FIG. 5 (Algorithm 1). All variables shown herein and in other pseudocodes, are described herein.

As the first position $p_i(t_1)$ has already been coded in the key picture with a reconstructed position $\hat{p}_i(t_1)$, it can be used to predict $p_i(t_2)$. In general, the previously coded keypoints in the trajectory are used generate a predictor for a next keypoint. Let $\{p_{i'}(t_j), t_j \in [t_2, t_3, \ldots, t_n]\}$ to be the predictors.

Figure 6:
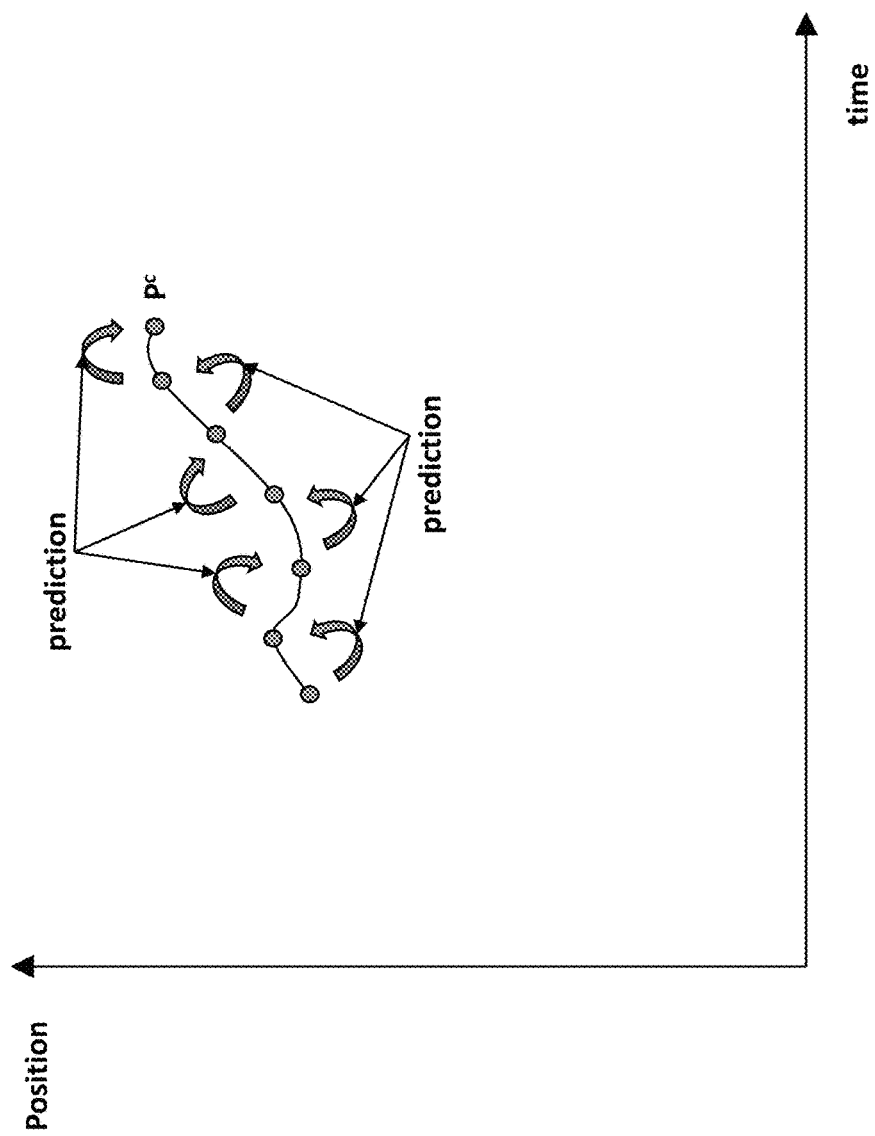
FIG. 6 is a schematic of a prediction relationship between the keypoints in the Intra-STC trajectory according to embodiments of the invention.

FIG. 6 shows the prediction relationship between the keypoints in an Intra-STC trajectory. We generate a 1-st order predictor as shown as in Eq. 4 or a 2-nd order predictor as in Eq. 5. A CDVA encoder can select between the two Intra-STC modes.

$$p_{i'}(t_j) = \hat{p}_i(t_{j-1}) + v_i(t_j - t_{j-1}), \text{ where} \quad (4)$$

$$v_i = \frac{p_i(t_n) - p_i(t_1)}{t_n - t_1}$$

is the keypoint velocity along a particular direction:

$$p_{i'}(t_j) = \hat{p}_i(t_{j-1}) + v_i(t_j - t_{j-1}) + \frac{1}{2}a_i(t_j - t_{j-1})^2, \text{ where} \quad (5)$$

$$v_i = \frac{p_i(t_n) - p_i(t_1)}{t_n - t_1} - \frac{1}{2}a(t_n - t_1)$$

is the keypoint initial velocity and $a_i$ denotes its acceleration.

Note that similar equations like Eq. 4 and 5 were used in the motion trajectory descriptor in MPEG-7. However, those were used to construct the path of a moving region, while the functions here are used to generate a position predictor in this invention.

After a predictor $p_{i'}(t_j)$ is determined, the residual $r_i(t_j)$ is then found as, $$r_i(t_j) = p_i(t_j) - p_{i'}(t_j), \text{ for } t_j \in [t_2, t_3, \ldots, t_n]. \quad (6)$$

An Intra-STC trajectory is coded with the following series of reconstructed numbers, given some quantization scheme, $$\{\hat{r}_i(t_2), \hat{r}_i(t_3), \ldots, \hat{r}_i(t_n)\}, \text{ for } \forall i \in \{x, y\}, \quad (7)$$

as well as prediction mode indicator (e.g., selection of prediction function from 1-st order function and 2-nd order function) and prediction parameters e.g., initial velocity v and acceleration a when 2-nd order function in use.

The reconstructed trajectory is obtained as, $$\hat{p}_i = p_{i'}(t_j) + \hat{r}_i(t_j), \text{ for } \forall t_j \in [t_2, t_3, \ldots, t_n]. \quad (8)$$

In FIG. 5 (Algorithm 1), SE stands for a syntax element, followed by a data type definition. In an encoder, the syntax element is written to a bitstream. In the decoder, it is obtained from a bitstream.

The prediction parameters v and a are coded for each trajectory in the example implementation of Algorithm 1. To further improve the coding efficiency, it can be preferred to code the parameters hierarchically from sequence or GOP level to trajectory level, or they can take predefined values without coding at all if the overhead is too heavy, e.g., simply let v=1, a=1.

2.2 Inter-Scalable Trajectory Coding

As there is redundancy between keypoint trajectories, in this section, we describe how to code some trajectories by removing such redundancies, which is called Inter-scalable Trajectory Coding (Inter-STC) mode. The trajectories coded in this mode use Intra-STC trajectories or other Inter-STC trajectories as references. In this section, a trajectory P represented by relative location changes $P_{(b)}$ is selected for the descriptions.

2.2.1 Distance Between Trajectories

We first define a distance between two trajectories $P^s$ and $P^t$. This is needed for the Inter-STC modes. Typically, such a distance is $$d(P^s, P^t) = \|P^s - P^t\|_2 \quad (9)$$

$$= \sum_{j=0}^{n} \sqrt{(p_x^s(t_j) - p_x^t(t_j))^2 + (p_y^s(t_j) - p_y^t(t_j))^2}.$$

However, during decoding a trajectory, the positions in the current trajectory, except for $\hat{P}(t_1)$ from the key picture, are unavailable, and hence it is impossible to evaluate the exact distance using the full trajectory as in Eq. 9. Thus, an estimated distance uses only the positions from key pictures as $$d_e(\hat{P}^s, \hat{P}^t) = \|\hat{P}^s - \hat{P}^t\|_2 \quad (10)$$

$$\approx \sum_{j \in \{anchors\}} \sqrt{(\hat{p}_x^s(t_j) - \hat{p}_x^t(t_j))^2 + (\hat{p}_y^s(t_j) - \hat{p}_y^t(t_j))^2}.$$

With the distance metric defined between trajectories, we describe three approaches to generate a trajectory predictor from low to high complexity/efficiency. An encoder implementation can select one of these according to a tradeoff evaluation on complexity/efficiency.

It is noted that an angle of a previously coded keypoint trajectory to the current keypoint trajectory can also be determined based on reconstructed keypoint positions in the key pictures.

2.2.2 Simple Trajectory Predictor

With the lowest complexity, a predefined search strategy is used to determine the trajectory predictor from trajectories that have been coded in a neighborhood.

Figure 7:
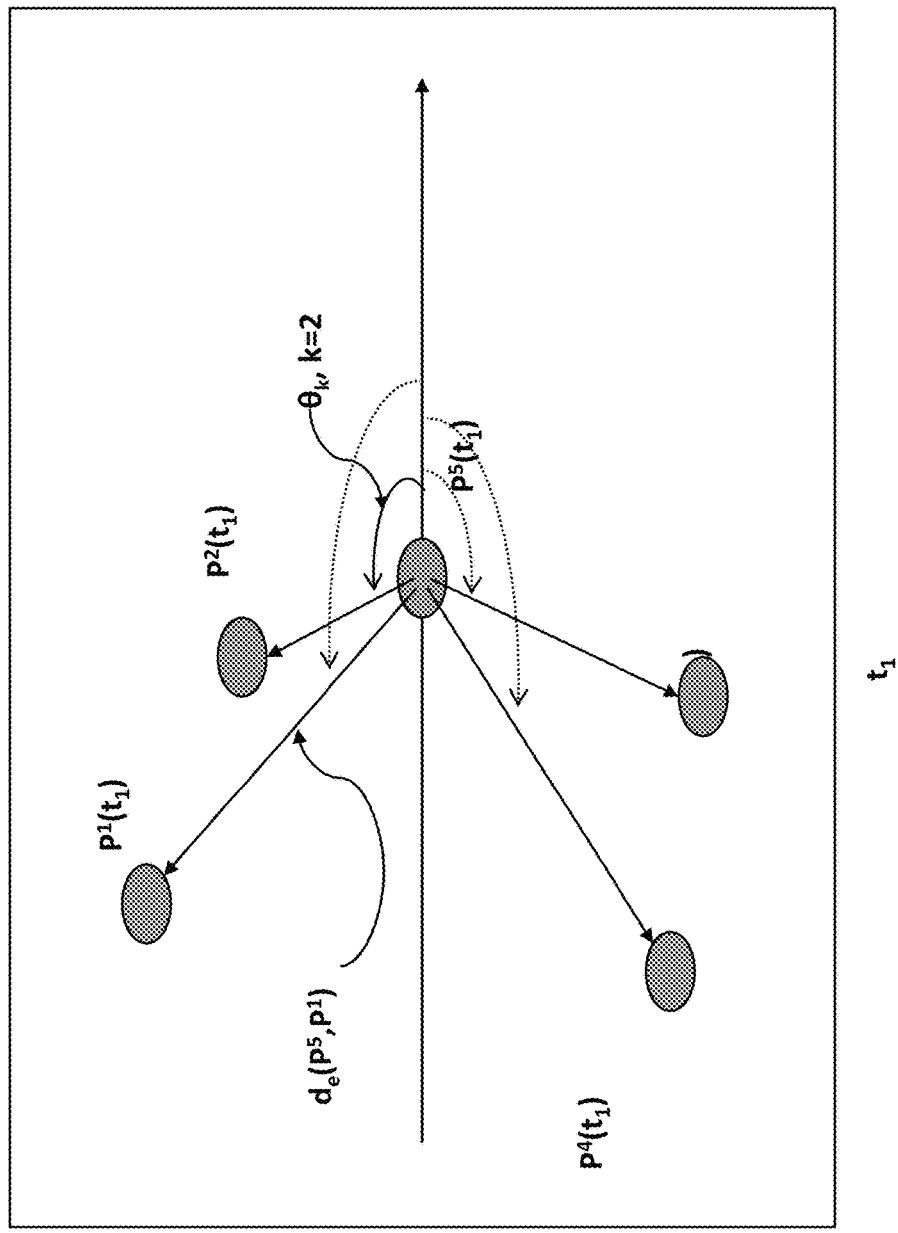
FIG. 7 is a schematic of how distances and orientations relative to the current trajectory are measured according to embodiments of the invention.

In a first step, we determine the trajectories nearest to the current trajectory using an estimated distance $d_e$ as in Eq. 10. If a unique trajectory is identified, then it is used as the trajectory predictor. Otherwise, if more than one trajectories are equally near to the current trajectory, a second criteria is used with the orientation $\theta_k \in [-\pi, \pi)$ between the current trajectory and the reference candidate in the key picture. The k-th trajectory with the largest $\theta_k$ is selected. The distances and orientations are illustrated in FIG. 7, where there are 4 keypoints already coded, and the current keypoint is number 5.

With a predefined trajectory predictor selection strategy, we need not signal the selection of reference trajectory in the bitstream. This can reduce bitrates for some applications.

2.2.3 Mean Trajectory Predictor

A more advanced method to generate trajectory predictor is to utilize a set of trajectories that are within a given distance threshold $d_{th}$ to the current trajectory. If there are s trajectories $\{P^{(1)}, P^{(2)}, \ldots, P^{(s)}\}$ within the neighborhood defined by the threshold $d_{th}$, then each dimension of the mean trajectory predictor is defined as $$P_i = \text{mean}\{\hat{P}_i^{(1)}, \hat{P}_i^{(2)}, \ldots, \hat{P}_1^{(s)}\}. \quad (11)$$

Similar to simple trajectory approach, the estimated distance $d_e$ in Eq. 10 is used to select the trajectory reference candidates. With the mean trajectory predictor, one can signal the threshold $d_{th}$ in the bitstream, if adaptive selection is preferred, otherwise, no signaling is needed to generate the reference trajectory.

2.2.4 Trajectory Reference List

A most flexible way to derive a trajectory predictor uses a trajectory reference list, which can bring improved compression performance with a bit overhead to be signaled in bitstream. In this approach, all existing trajectories from a neighborhood are arranged into an initial reference list L, sorted first by distances relative to the current trajectory using the estimated distance measurement $d_e$ in Eq. 10, then by orientations as shown in FIG. 7.

The trajectory predictor list L can be inserted with some derived trajectories based on the existing ones. For example, we insert the mean trajectory, as in Eq. 11, at the first position of the initial trajectory list. Each trajectory is associated with an index in the list L, as $$L = \{\hat{P}_i^{(1)}, \hat{P}_i^{(2)}, \ldots, \hat{P}_i^{(s)}\}. \quad (12)$$

The encoder selects the best predictor from the list L, and signal its associated reference index f in the bitstream. Finally, the trajectory predictor is given by $$P_i = \hat{P}^{(f)}. \quad (13)$$

Figure 8:
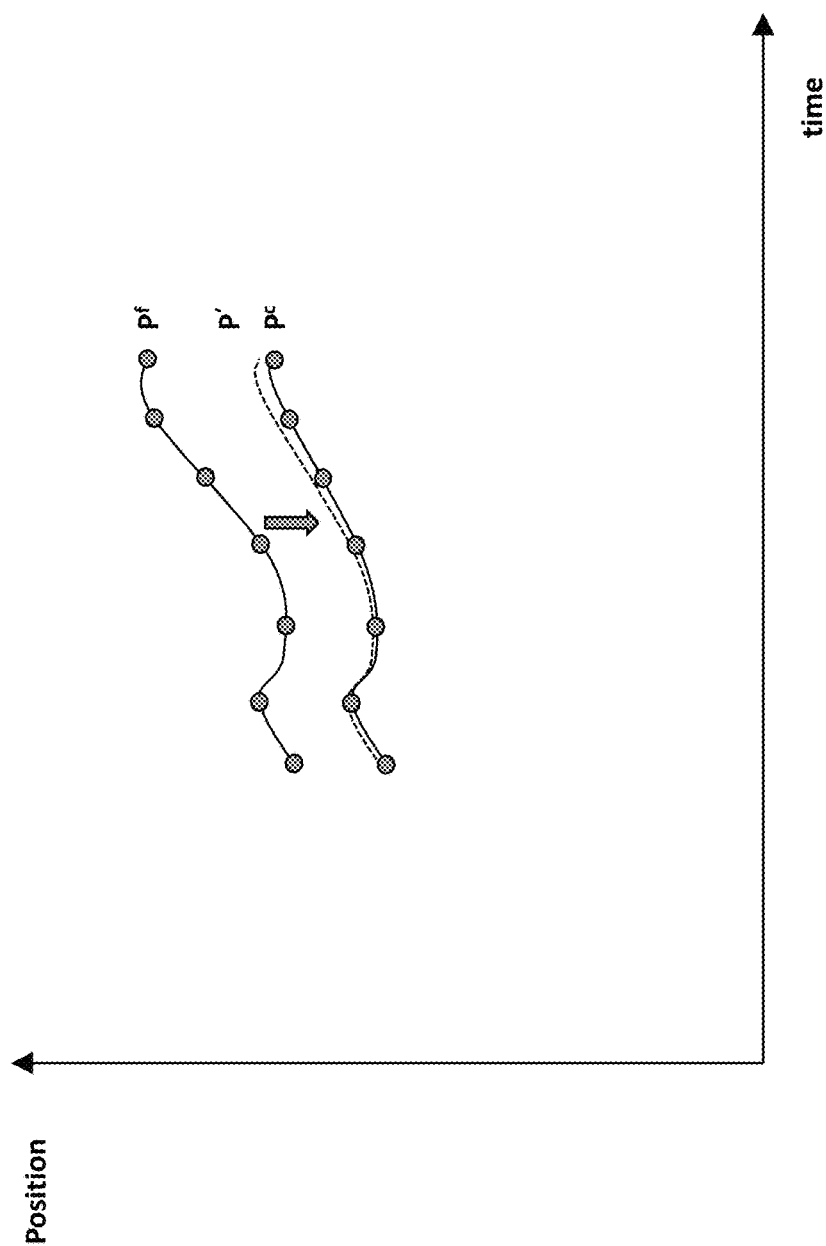
FIG. 8 is a schematic of the use a single reference trajectory with Inter-scalable Trajectory Coding according to embodiments of the invention.

The use of a reference trajectory is shown in FIG. 8. While the encoder determines the best reference trajectory in the list, the full measurement of distance d in Eq. 9 is used, as it is more accurate and can achieve a better compression performance.

2.2.5 Inter-Scalable Trajectory Coding

After a trajectory predictor P' is determined, the trajectory residual R is determined and coded, for each dimension respectively $$R_i = P_i - P_{i'}. \quad (14)$$

2.2.6 Skip-Scalable Trajectory Coding Mode

When the trajectory residual R is near to 0, the encoder can select a special inter-scalable trajectory coding mode for the current trajectory and avoid coding the residual. This method is called Skip-scalable Trajectory Coding (SsTC).

If not all residual trajectories are skipped, signalling between skip and coding need to be conveyed in the bitstream.

2.3 Bi-Scalable Trajectory Coding

The inter-scalable trajectory coding described above uses a single reference trajectory. In this subsection, we describe a bi-scalable trajectory coding mode where two reference trajectories are to be used.

Assuming the trajectory reference list L is in use, we compose a secondary trajectory list L2 in addition to L as constructed in Section 2.2.4. The encoder determines the trajectory predictor as a weighted sum of two trajectory references $\hat{P}^f$ and $\hat{P}^b$, from L and L2, respectively, $$P' = \frac{1}{d_e^f + d_e^b}(d_e^b \hat{P}^f + d_e^f \hat{P}^b), \quad (15)$$

where $d_e^f$ and $d_e^b$ are distance measured from $\hat{P}^f$, $\hat{P}^b$ to $P^C$. The secondary trajectory reference list L2 can be composed of the same elements in L with a revised order, e.g., to swap the first two reference trajectories. f and b are the index of $\hat{P}^f$ and $\hat{P}^b$ in list L and L2, respectively.

Figure 9:
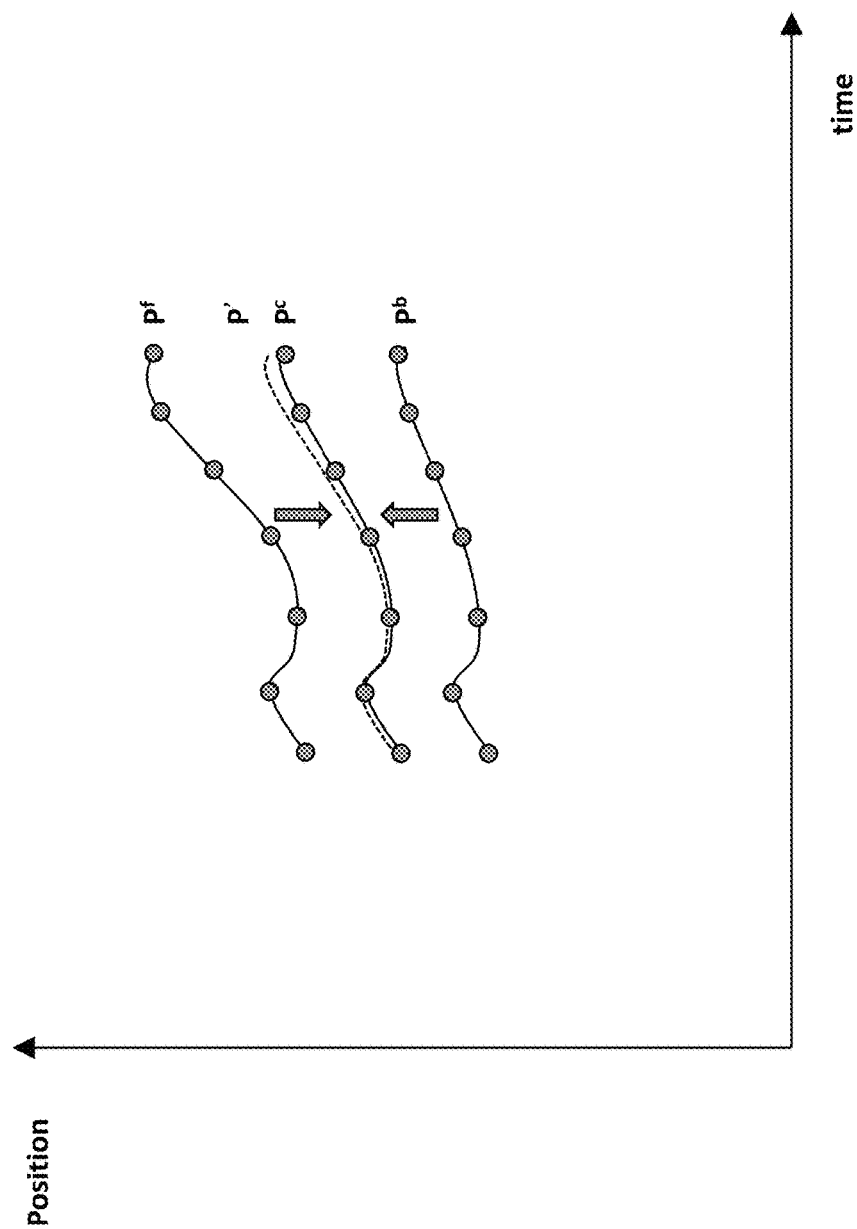
FIG. 9 is a schematic of the use of two reference trajectories with Bi-scalable Trajectory Coding according to embodiments of the invention.

Using two reference trajectories to predict the current trajectory is shown in FIG. 9.

2.3.1 Direct-Scalable Trajectory Coding Mode

Similar to Inter-STC, the residual from the bi-prediction can be coded or be skipped based on a rate distortion evaluation. When the residual are not to be coded, such an Bi-scalable STC is named as a Direct-scalable Trajectory Coding (DsTC) mode.

The Inter-scalable Trajectory Coding (ITC) including Bi-scalable Trajectory Coding are implemented in an example encoder as shown in FIG. 10 (Algorithm 2).

An encoder that implements both Intra-scalable Trajectory Coding and Inter-scalable Trajectory Coding is shown in FIG. 11 (Algorithm 3).

2.4 Short- and Long-Term Reference Trajectories

In the above description, we use all trajectories that have been coded previously as potential reference trajectory candidate. This can involve high memory consumption and high computation complexity.

To address potential complexity issues, in one embodiment, a sliding window operation removes "older" trajectories out of the consideration, where a fixed number of reference candidate within a coding window are maintained. A newly coded trajectory moves into the sliding window. For trajectories inside the sliding window, a "first-in-first-out" operation is performed to keep only the most recently coded trajectories as reference trajectory candidates, which are called short-term reference trajectories. The selection of the sliding window size w controls the required complexity or memory requirement.

In this subsection, we describe another type of reference trajectory, i.e., long-term reference trajectory. This type of reference trajectory is always put in the reference trajectory list in addition to the short-term reference trajectories, until it is explicitly removed from reference candidate list. This flexibility allows an encoder to put a good reference candidate for many trajectories to be coded. For example, a representative trajectory of a human body can be a long-term reference trajectory for trajectories of keypoints from his head and four limbs, etc.

3 Interframe Trajectory Coding (ITC)

Besides scalable trajectory coding (STC), we now describe the interframe trajectory coding (ITC) method, where all keypoints in a picture are coded before coding any keypoint from another picture. In particularly, if the picture coding order is exactly the same as the picture presentation (capture) order, then the delay to return (preliminary) video analysis results is minimized to 1-frame delay, which is useful for some real-time applications, and it is referenced as low-delay interframe trajectory coding (LDTC) hereinafter. With STC, however, such a delay is typically equal to the period of a full GOP. We assume the keypoint positions $P=P_{(a)}$ are relative to the image coordinate system.

3.1 P-Interframe Trajectory Coding

For a first approach to do interframe trajectory coding (ITC), the keypoints from an older picture are used to predicatively code the keypoints in the current picture, which is called P-interframe Trajectory Coding (PTC).

Figure 12:
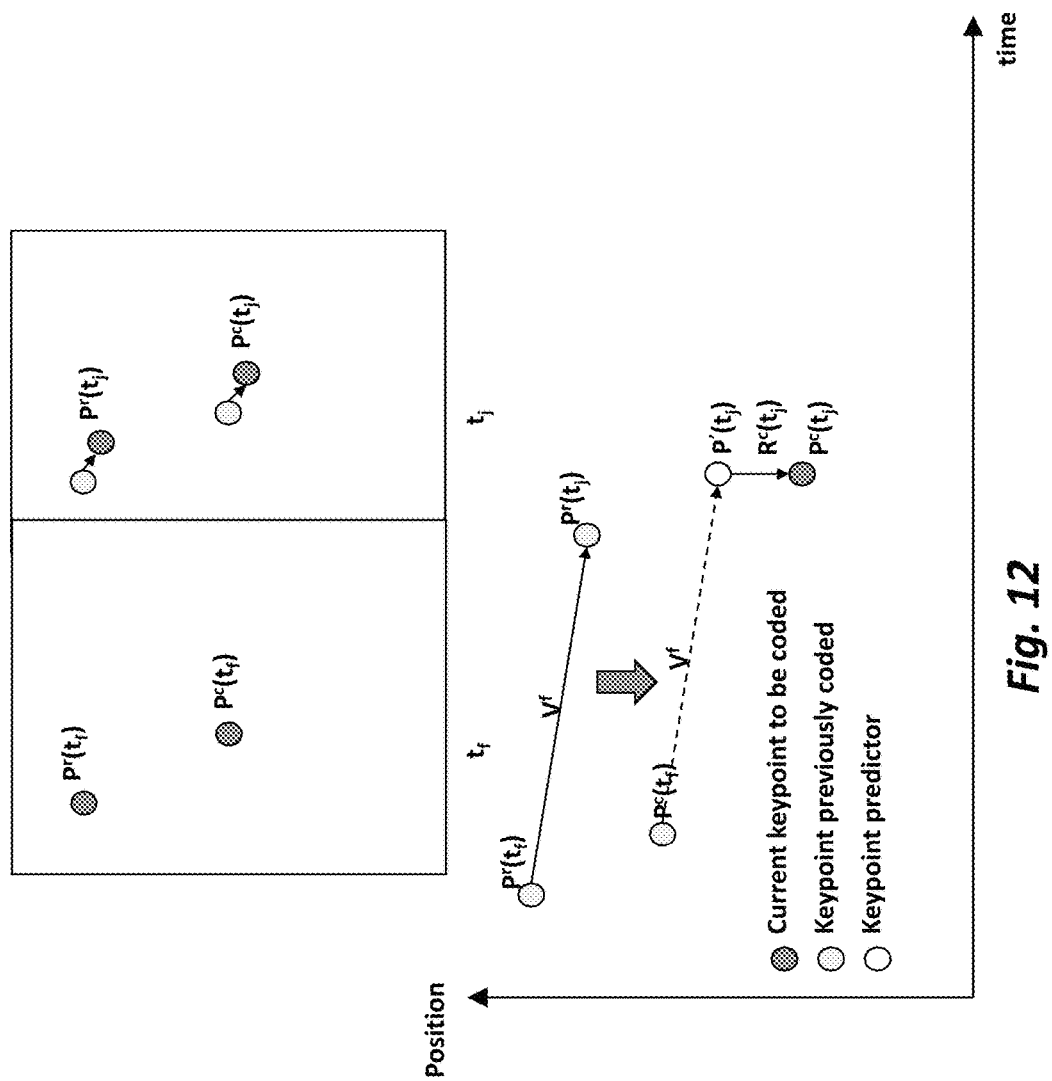
FIG. 12 is a schematic of an example P-interframe Trajectory Coding according to embodiments of the invention.

We assume all $\{P(t_1)\}$ have been coded using CDVS. Now we need to predict keypoints $\{P^c(t_j), c \in [1,m]\}$ in picture $\{t_j, j \geq 2\}$ using a previously coded picture $\{t_f, f \geq 1\}$ as a reference. The prediction shown in FIG. 12 is described as below.

Among the keypoints that have been coded in the current picture $t_j$, we determine the keypoint r that is nearest to the current keypoint c using the distance $|\hat{P}^r(t_f) - \hat{P}^c(t_f)|$ measured in picture $t_f$. A translation vector for keypoint r is $$V^f = \hat{P}^r(t_j) - \hat{P}^r(t_f). \tag{16}$$

Then the predicted keypoint c is $$P'(t_j) = \hat{P}^c(t_f) + V^f. \tag{17}$$

The residual is $$R^c(t_j) = P^c(t_j) - P'(t_j). \tag{18}$$

If there is not a keypoint r, or it does not provide a good predictor $P'(t_j)$, the keypoint c is coded without referencing a previous picture. In that case, the principle of Intratrajectory prediction in Section 2.1 can be applied.

If the residual $R^c$ in Eq. 18 is small enough to be discarded, it is a special ITC coding mode, called as Skip-interframe Trajectory Coding (SiTC) mode. Proper syntax is be signaled if not all residual are discarded. In addition, one can utilize a reference picture list to manage multiple reference pictures. While coding the current picture, a reference picture index is used to signal the best reference picture. In this case, a reference picture management methods, e.g., the principle of sliding window operation as in Section 2.4 can be applied on the reference pictures instead of reference trajectories.

By enforcing a coding order that no picture in the future (with a capturing timestamp in the future) is coded prior to a picture in the past, a low-delay interframe trajectory coding (LDTC) can be implemented using P-interframe only trajectory coding. For the example trajectories in FIG. 4, the keypoints will be coded in the following order for a LDTC, $$\{P^1(t_2), P^2(t_2), \ldots, P^5(t_2); P^1(t_3), P^2(t_3), \ldots, P^5(t_3)\}, \tag{19}$$

where all $\{P(t_1)\}$ have been coded using CDVS without interframe prediction, picture $t_2$ uses picture $t_1$ as a reference, and picture $t_3$ uses pictures $t_2$ and $t_1$ as reference candidates.

3.2 B-Interframe Trajectory Coding

When an application can relax the requirement for a minimum delay, we arrange a different coding order than the picture presentation order to favor a higher coding efficiency. Instead of using a single reference picture with PTC, two reference pictures are utilized simultaneously in the B-interframe Trajectory Coding (BTC).

For the trajectories shown in FIG. 4, the keypoint positions in the trajectories are coded, for example, in the following manner. The keypoints in picture $t_3$ are coded with PTC and the keypoints in picture $t_2$ are coded using BTC by using the keypoints in $t_1$ and $t_3$ as references simultaneously. The coding order of keypoints is, $$\{P^1(t_3), P^2(t_3), \ldots, P^5(t_3); P^1(t_2), P^2(t_2), \ldots, P^5(t_2)\}, \tag{20}$$

after $\{P^c(t_1), \forall c \in [1,5]\}$ have been coded using CDVS without interframe prediction.

Figure 13:
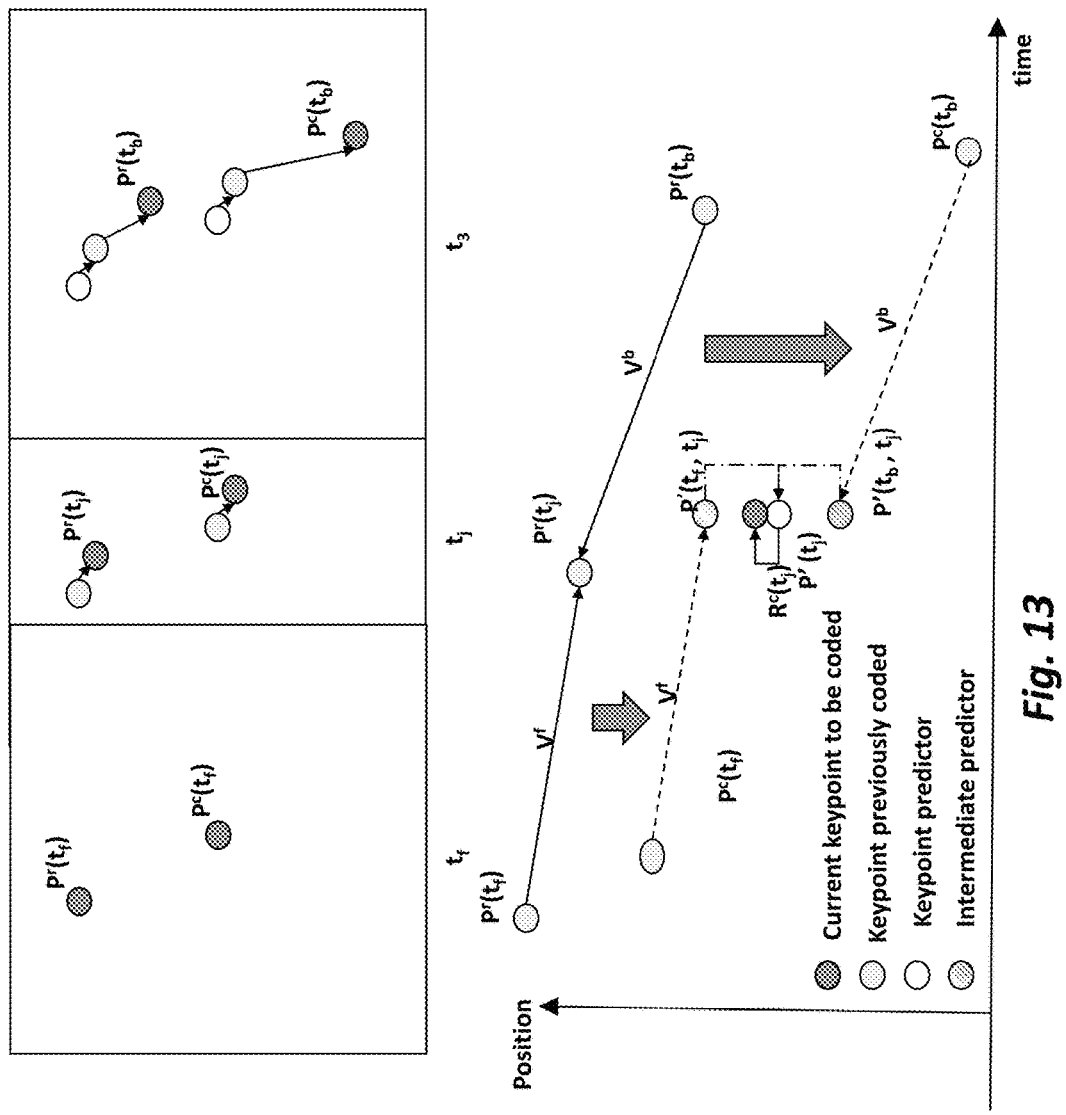
FIG. 13 is a schematic of an example B-interframe Trajectory Coding according to embodiments of the invention.

In general, for a bi-interframe trajectory coded picture $t_j$, we predict $P(t_j)$ using two previously coded picture $t_f$ and $t_b$ as references. For example, $t_f$ is the nearest reference picture from the past and $t_b$ is the nearest reference picture from the future. $t_f$ and $t_b$ are named as forward reference picture and backward reference picture hereinafter, though either of them can appear from past or from future based on an optimal encoder decision. In the example above Eq. 20, f=1, b=3 and j=2. After selecting the forward and backward reference pictures, the prediction procedure in FIG. 13 is described as following.

First, among the keypoints that have been coded in the current picture $t_j$, determine the keypoint r that is nearest to the current keypoint c using the distance $|\hat{P}^r(t_f) - \hat{P}^c(t_f)|$ measured in picture $t_f$.

For keypoint r, two translation vectors corresponding to the forward and backward references are determined as $$V^f = \hat{P}^r(t_j) - \hat{P}^r(t_f), V^b = \hat{P}^r(t_j) - \hat{P}^r(t_b). \tag{21}$$

Then, two intermediate predicted keypoints for c are given by $$P'(t_f, t_j) = \hat{P}^c(t_f) + V^f, P'(t_b, t_j) = \hat{P}^c(t_b) + V^b. \tag{22}$$

The weighted keypoint predictor c is given according to the distances in temporal direction, $$P'(t_j) = \frac{1}{|t_f - t_j| + |t_b - t_j|}(|t_b - t_j|P'(t_f, t_j) + |t_f - t_j|P'(t_b, t_j)). \tag{23}$$

The final residual is $$R^c(t_j) = P^c(t_j) - P'(t_j). \tag{24}$$

If the residual $R^c$ is small enough to be discarded, the special BTC mode is named as a Direct-interframe Trajectory Coding (DiTC) mode. Similar syntax signaling like the DsTC mode in Section 2.3 is required if not all such residual are to be discarded. When multiple reference pictures are used, an independent reference picture list is be maintained for each prediction direction and an index to select a reference picture is required.

In the above description, the same keypoint r is used for both forward and backward prediction, which was selected based solely on the forward reference picture. In another embodiment, the different keypoint r' can be selected for the backward prediction according to the backward reference picture and the principle above still applies.

4 Discussions Related to Trajectories

4.1 Long Trajectories Across GOPs

In previous sections, we described two categories of approaches to code the keypoint trajectories. We assumed that a video is split into GOP structure to limit the codec complexity.

Within one GOP, we use a same keypoint index to connect the keypoints from different pictures such that a trajectory can be reconstructed. Unfortunately, it would bring issues when some trajectories is across the GOP boundaries when splitting the video into GOPs, because the keypoints may be re-indexed for a new GOP. Though one can leave it to the server/receiver to decide how to connect trajectories from one GOP to another GOP by computing/comparing the distance between feature descriptors from neighboring GOPs, an obvious down-side is that it may lead to inconsistency in reconstructed trajectories. To avoid such ambiguous, in one embodiment, one can restrict the decoder using the same method to join the trajectories. In this invention, we signal the relationship between trajectories across a GOP boundary such that the encoder can even use some method developed in the future to join trajectories from neighbor GOPs.

A mapping table indexed by the keypoint index from a next GOP has values assigned as the keypoint index of the same trajectory from its preceding GOP. Since we assumed that the keypoint index number c>0, we assign a special value, e.g., 0, indicating that this is a new trajectory that is unavailable in preceding GOP.

FIG. 14 shows one example mapping table. The trajectories 1, 3, and 4 from the previous GOP will continue in the current GOP with new trajectory index 1, 2 and 3. The trajectories 4, 5 and 6 are new trajectories in the current GOP.

4.2 Feature Descriptor Coding Along a Trajectory

By coding trajectories, the feature descriptors from different pictures are linked if they are near to each other. Hence one typically can skip coding the feature descriptors in non-key pictures. In case that the changes in feature descriptor can accumulate to an unacceptable level over time, we code the relative changes in feature descriptors. Such coding uses feature descriptors appearing earlier in the trajectory to predict those appearing later.

5 Constrained Matrix Factorization

In this section, we describe a novel way to determine the trajectories through a constrained matrix factorization through a GOP. Similar to a prior art matrix factorization approach, the descriptors from all pictures in a GOP are stacked to form a matrix $X \in R^{m \times N}$, where m is the length of a feature descriptor and N is the total number of descriptors from the GOP.

Visually salient objects in a video scene maintain a nearly stationary descriptor representation throughout the GOP. Hence, the problem of determining a compact descriptor of a video scene can be formulated as finding a low dimensional representation of the matrix X. In other words, X is represented in the following manner, $$X \approx LR, \quad (25)$$

where $X \in R^{m \times N}$, $L \in R^{m \times r}$, $R \in R^{r \times N}$, and $r \ll N$.

In the solution to Eqn. 25, the following non-negative matrix factorization (NMF) is used to determine the compact descriptors, $$(\hat{L}, \hat{R}) = \min_{\substack{L \in R_+^{m \times r}, \\ R \in R_+^{r \times N}}} \frac{1}{2} \|X - LR\|_F^2 \quad (26)$$

$$\text{subject to } \begin{cases} \|L_i\|_2 = 1, \forall i \in \{1, \ldots r\} \\ \|R_j\|_0 = 1, \forall j \in \{1, \ldots N\} \end{cases},$$

where all the columns of L are open to be selected in the optimization. Each column in L is actually a representing feature descriptor.

In order to maintain backward compatibility, unlike in Eqn. 25 and 26, all columns in matrix L can be selected, in this invention we split the matrix L into two partitions $$L = [L_a, L_b], \quad (27)$$

where $L_a \in R^{m \times r_a}$, $L_b \in R^{m \times r_b}$, and $r_a + r_b = r$. Accordingly, R is written as, $$R = \begin{bmatrix} R_a \\ R_b \end{bmatrix}, \quad (28)$$

where $R_a \in R^{r_a \times N}$ and $R_b \in R^{r_b \times N}$.

In this section, $L_a$, the first partition of L with $r_a$ columns, is determined based on the descriptors extracted/coded for the key picture of a GOP. Then, we determine $L_b$, given $L_a$ being fixed.

5.1 Determination of $L_a$

Because $L_a$ is formed based on the feature descriptors corresponding to the key picture, which are already coded, e.g., using CDVS scenario, we typically do not need code $L_a$ again. Instead, we need to specify how to pick up feature descriptors for $L_a$.

We assume that:

1. Feature descriptors from the key picture are sorted and indexed. In CDVS, the local features are sorted on the basis of a relevance probability measure; and 2. Coordinates of each feature descriptor in key picture are coded and accessible.

In one case, all feature descriptors coded for key picture are placed in $L_a$. For example, for the videos within the video database, this is desired so as to make the trajectory set as complete as possible.

In another case, it can be preferred to have a subset of feature descriptors from key picture to be included in $L_a$. In case of query video, it can be preferred to narrow down the selection of feature points in $L_a$ to the region of interest (ROI), e.g., foreground objects or moving objects than backgrounds. In this way, the video analysis results can be customized according to the user's demand while reducing the transmission bitrates at the same time.

To handle both cases in a complying manner, it is necessary to signal selection of feature descriptor from key picture for $L_a$ as shown in FIG. 15 (Algorithm 4).

After $L_a$ is fixed, $R_a$ is also determined. Actually, $R_a$ is always equal to an identity matrix $I_{r_a \times r_a}$ padded with zeros to the right side, $$R_a \times \{I_{r_a \times r_a} | 0_{r_a \times (N - r_a)}\}. \quad (29)$$

5.2 Computing $L_b$ with Given $L_a$

After $L_a$ and $R_a$ are determined, we determine $L_b$ and $R_b$. Given that one GOP does not cover more than one scene, it can be imagined that $L_b$ would reflect additional feature descriptors from dis-occlusions, e.g., due to translation motion and/or new objects popping into the scene.

When no dis-occlusion happens, it can be found that $r_b \approx 0$. On the other hand, when large dis-occlusions being present, $r_b$ would not be negligible, especially if the background objects are of interest. Under such circumstances, we need to determine $L_b$.

In one embodiment, we describe a modified projected proximal-point alternating least squares minimization algorithm as shown in FIG. 16 (Algorithm 5.2). In every iteration k of the algorithm, the factors $L_k$ and $R_k$ are updated by first determining the minimizer of the proximal least squares terms, $$\tilde{L}_b = \arg\min_{L_b \in R^{m \times r_b}} \frac{1}{2} \|X - [L_a, L_b] R_k\|_F^2 + \frac{\rho}{2} \|[L_a, L_b] - L_k\|_F^2, \quad (30)$$

$$\tilde{R}_b = \arg\min_{R_b \in R^{r_b \times N}} \frac{1}{2} \left\|X - L_k \begin{bmatrix} R_a \\ R_b \end{bmatrix}\right\|_F^2 + \frac{\rho}{2} \left\|\begin{bmatrix} R_a \\ R_b \end{bmatrix} - R_k\right\|_F^2.$$

The columns of $\tilde{L}$ are then projected onto the non-negative $l_2$ unit ball, while the columns of $\tilde{R}$ are projected onto the admissible set of standard basis vectors $$E_r := \{e_i \in R^r: e(i) = 1, \text{ and } 0 \text{ otherwise}, i \in \{1, \ldots r\}\}, \quad (31)$$

by setting the largest non-negative entry in each column to one and the remaining entries to zero. Note that $\tilde{L}$ and $\tilde{R}$ admit closed form solutions as shown in Algorithm 5.

The factors $L_0=[L_a, L_{b,0}]$ and $R_0=[R_a^T, R_{b,0}^T]^T$ are initialized with independent identically distributed uniform random entries for $L_{b,0}$ and $R_{b,0}$ and $L_a$ and $R_a$ being given. The iterates $\tilde{L}$ and $\tilde{R}$ are determined by solving proximal-point alternating least squares functionals and then keeping only the positive entries $\tilde{L}_+$ and $\tilde{R}_+$ in the factors plus the given partitions $L_a$ and $R_a$. Finally, the factors are projected onto the unit column norm ball for $\tilde{L}$, and onto the binary selector set $E_r$ for $\tilde{R}$.

In the end, as R is the selecting matrix and it represents the trajectories of all feature points throughout the GOP. L is a complete set of representing feature descriptors.

5.3 Complexity-Limited Trajectory Determining Approaches

It is realized that in most applications, it is unnecessary to even consider $L_b$. That is, it is enough to just consider the features available from the key picture in a GOP. With such considerations, the first step to update L within the iteration in FIG. 16 (Algorithm 5.2) can be eliminated because L is given by those feature descriptors in the key picture.

6 Block-Based Trajectory Coding

In the sections above, we described a few trajectory coding approaches with each trajectory being a coding unit. In this section, we describe a more advanced trajectory approach which applies the same principles described above on a new coding unit specified by a block of trajectories.

6.1 Block of Trajectories

Two types of blocks are herein specified. Type 1 block of trajectories is implicitly specified using some fixed grid partitioning method. For example, the trajectories could be partitioned into small blocks according to their location in the key picture. The size of block grid could be predefined as one of the following, e.g. 4×4, 8×8, 8×4, 4×8, 16×16, 16×8, 8×16, . . . , up to MaxBlockWidth×MaxBlockHeight; or indicated in bitstream by a mixed of the above sizes.

Type 2 block of trajectories is explicitly specified if an encoder allows some object segmentation procedure. With type 2 trajectory block, the trajectories from a image segmentation is grouped into a single block. This approach needs to signal the image segmentation explicitly in the bitstream.

6.2 Block-Based Trajectory Coding

Both the proposed scalable trajectory coding (STC) in Section 2 and the proposed interframe trajectory coding (ITC) in Section 3 are able to be extended to a block-based trajectory coding.

For single trajectory based STC, the scalability could be achieved up to a single trajectory level. While with its block-based STC, the scalability would be at trajectory block level.

For single trajectory based ITC, the prediction from reference pictures are realized for trajectory by trajectory. While with block-based ITC, the interframe prediction instead is implemented in the unit of trajectory block.

The extension to block-based trajectory coding could bring coding benefits by reducing signaling overheads and may be preferred for an application.

6.3 Transformation Trajectory Coding and Quantization

After performing block based trajectory prediction (either block based STC, or block based ITC), a residual signal is obtained.

In one embodiment, quantization could be applied directly on the residual signal after prediction.

In another embodiment, we can first apply a transform, e.g. DCT-like transformation, on the residual signal so as to compact the signal energy to fewer dimensions. Due to the energy compact property from the transform, it may be preferable to apply a quantization process on the transformed coefficients with less distortion being introduced.

Although the invention has been described by way of examples of preferred embodiments, it is to be understood that various other adaptations and modifications can be made within the spirit and scope of the invention. Therefore, it is the object of the appended claims to cover all such variations and modifications as come within the true spirit and scope of the invention.

We claim:

1. A method for processing keypoint trajectories in a video, wherein the keypoint trajectories describe motion of a plurality of keypoints across pictures of the video over time, comprising steps of:
   acquiring the video of a scene using a camera;
   detecting keypoints and associated feature descriptors in each picture;
   matching the keypoints and associated features descriptors between neighboring pictures to generate keypoint trajectories, each keypoint trajectory specifies locations of a corresponding keypoint in different pictures of the video;
   coding predictively locations of the keypoints in the keypoint trajectories into a bitstream, wherein the coding includes determining a residual between a current location of a keypoint in a picture and a location of the keypoint predicted using a reference keypoint trajectory, and adding the residual into the bitstream, such that the keypoint trajectories are coded in scalable manner so that all the keypoints of a first trajectory are coded before a current trajectory, and a previous keypoint in a keypoint trajectory is used to predict a later keypoint of the keypoint trajectory, and a keypoint prediction is implemented using a first order predictor; and
   outputting the bitstream, wherein the steps are performed in a processor.

2. The method of claim 1, wherein the keypoint prediction is implemented using a second order predictor.

3. The method of claim 1, wherein a keypoint velocity is signaled in the bitstream.

4. The method of claim 2, wherein a keypoint velocity and a keypoint acceleration are signaled in the bitstream.

5. A method for processing keypoint trajectories in a video, wherein the keypoint trajectories describe motion of a plurality of keypoints across pictures of the video over time, comprising steps of:
   acquiring the video of a scene using a camera;
   detecting keypoints and associated feature descriptors in each picture;
   matching the keypoints and associated features descriptors between neighboring pictures to generate keypoint trajectories, each keypoint trajectory specifies locations of a corresponding keypoint in different pictures of the video;
   coding predictively locations of the keypoints in the keypoint trajectories into a bitstream, wherein the coding includes determining a residual between a current location of a keypoint in a picture and a location of the keypoint predicted using a reference keypoint trajectory, and adding the residual into the bitstream, such that the keypoint trajectories are coded in scalable manner so that all the keypoints of a first trajectory are coded before a current trajectory, and a previously coded keypoint trajectory is used to generate a trajectory predictor to predict the current trajectory, wherein a distance from the previously coded keypoint trajectory to a current keypoint trajectory is estimated from reconstructed keypoint positions in the keypoint pictures; and outputting the bitstream, wherein the steps are performed in a processor.

6. The method of claim 5, wherein an orientation of a previously coded keypoint trajectory relative to the current keypoint trajectory is based on reconstructed keypoint positions in the key pictures.

7. The method of claim 5, wherein two previously coded keypoint trajectories are used to generate the trajectory predictor for the current trajectory.

8. The method of claim 5, wherein a first keypoint reference trajectory is selected as being nearest to the current trajectory based on a distance measurement.

9. The method of claim 8, wherein the selection is additionally based on an orientation measurement.

10. The method of claim 5, wherein a first keypoint reference trajectory list is initialized by the previously coded keypoint trajectories that are within a predefined distance to the current trajectory.

11. The method of claim 10, wherein a reference keypoint trajectory is generated by taking a mean value of the keypoint trajectories in the initialized keypoint reference trajectory list.

12. The method of claim 10, wherein the first reference keypoint trajectory is signaled by an index number in the first reference keypoint trajectory list.

13. The method of claim 10, wherein a second reference trajectory list is constructed.

14. The method of claim 13, wherein the second reference trajectory list is constructed from the first reference trajectory list by swapping the first two trajectories in the first reference trajectory list.

15. The method of claim 13, wherein the second reference keypoint trajectory is signaled by an index number in the second reference trajectory list.

16. The method of claim 15, wherein the reference trajectory predictor is generated by a weighted average of the first reference trajectory and the second reference trajectory based on their distances to the current trajectory.

17. A method for processing keypoint trajectories in a video, wherein the keypoint trajectories describe motion of a plurality of keypoints across pictures of the video over time, comprising steps of:

acquiring the video of a scene using a camera;
detecting keypoints and associated feature descriptors in each picture;
matching the keypoints and associated features descriptors between neighboring pictures to generate keypoint trajectories, each keypoint trajectory specifies locations of a corresponding keypoint in different pictures of the video;
coding predictively locations of the keypoints in the keypoint trajectories into a bitstream, wherein the coding includes determining a residual between a current location of a keypoint in a picture and a location of the keypoint predicted using a reference keypoint trajectory, and adding the residual into the bitstream, such that the keypoint trajectories are coded in scalable manner so that all the keypoints of a first trajectory are coded before a current trajectory, and a previously coded keypoint trajectory is used to generate a trajectory predictor to predict the current trajectory, wherein a single previously coded keypoint trajectory is used to generate the trajectory predictor for the current trajectory; and
outputting the bitstream, wherein the steps are performed in a processor.

18. A method for processing keypoint trajectories in a video, wherein the keypoint trajectories describe motion of a plurality of keypoints across pictures of the video over time, comprising steps of:

acquiring the video of a scene using a camera;
detecting keypoints and associated feature descriptors in each picture;
matching the keypoints and associated features descriptors between neighboring pictures to generate keypoint trajectories, each keypoint trajectory specifies locations of a corresponding keypoint in different pictures of the video;
coding predictively locations of the keypoints in the keypoint trajectories into a bitstream, wherein the coding includes determining a residual between a current location of a keypoint in a picture and a location of the keypoint predicted using a reference keypoint trajectory, and adding the residual into the bitstream, such that the keypoint trajectories are coded in scalable manner so that all the keypoints of a first trajectory are coded before a current trajectory, and a previously coded keypoint trajectory is used to generate a trajectory predictor to predict the current trajectory, wherein a residual trajectory is computed as the difference from the trajectory predictor and the current trajectory; and
outputting the bitstream, wherein the steps are performed in a processor.

19. The method of claim 18, wherein the residual trajectory is coded in a bitstream.

20. The method of claim 18, wherein the residual trajectory is signalled as being skipped in a bitstream.

* * * * *